(12) United States Patent
Fang et al.

(10) Patent No.: US 12,072,509 B2
(45) Date of Patent: Aug. 27, 2024

(54) POSITIONING METHOD AND POSITIONING APPARATUS FOR DISPLAY SCREEN IN OPTICAL MODULE

(71) Applicant: GOERTEK INC., Shandong (CN)

(72) Inventors: Bin Fang, Shandong (CN); Bo Xu, Shandong (CN); Zhanfa Liu, Shandong (CN); Jiehao Xu, Shandong (CN)

(73) Assignee: Goer Optical Technology Co., Ltd., Shandong (CN)

( * ) Notice: Subject to any disclaimer, the term of this patent is extended or adjusted under 35 U.S.C. 154(b) by 945 days.

(21) Appl. No.: 17/051,582

(22) PCT Filed: Dec. 18, 2018

(86) PCT No.: PCT/CN2018/121690
§ 371 (c)(1),
(2) Date: Oct. 29, 2020

(87) PCT Pub. No.: WO2019/237700
PCT Pub. Date: Dec. 19, 2019

(65) Prior Publication Data
US 2021/0373352 A1    Dec. 2, 2021

(30) Foreign Application Priority Data

Jun. 11, 2018   (CN) .......................... 201810594018.7

(51) Int. Cl.
*G02B 27/62*   (2006.01)
*G02B 27/01*   (2006.01)
(Continued)

(52) U.S. Cl.
CPC ......... *G02B 27/62* (2013.01); *G02B 27/0179* (2013.01); *G03B 21/56* (2013.01);
(Continued)

(58) Field of Classification Search
CPC .... G02B 27/62; G02B 27/0179; G03B 21/56; G03B 21/60; G03B 21/58; G03B 21/625; G03B 21/62
(Continued)

(56) References Cited

U.S. PATENT DOCUMENTS 11,343,477 B2 *   5/2022   Han .................... H04N 9/3191
2011/0310478 A1 * 12/2011  Silverstein ............. G03B 21/60
                                                        359/443
(Continued)

FOREIGN PATENT DOCUMENTS

CN   106707448 A  *  5/2017  .......... G02B 27/017
CN   106707448 A     5/2017
(Continued)

OTHER PUBLICATIONS

Li et al., Fast calibration method of alignment prism based on image transformation relation, Journal of Physics: Conference Series, 2021, 9 pg(s) (Year: 2021).*

(Continued)

*Primary Examiner* — Stephanie E Bloss
*Assistant Examiner* — Kevin C Butler
(74) *Attorney, Agent, or Firm* — Baker Botts LLP

(57) ABSTRACT

Provided are a positioning method and apparatus for a display screen in an optical module. The positioning method for the display screen in the optical module comprises the following steps: arranging light paths of an optical lens and image receiving device of a product coaxially; providing the display screen, and activating the display screen, wherein the display screen displays an image, and a light path formed by a light ray from the image passes through the optical lens; the image receiving device receives the light path passing through the optical lens in real time to obtain a virtual image; calculating a slope deviation of the display screen; calcu-
(Continued)

lating a distance deviation from the display screen to the optical lens; calculating a plane position deviation of the display screen; and calibrating a relative position of the display screen according to a calculation result.

10 Claims, 5 Drawing Sheets

(51) Int. Cl.
    *G03B 21/56*     (2006.01)
    *G03B 21/58*     (2014.01)
    *G03B 21/60*     (2014.01)
    *G03B 21/62*     (2014.01)
    *G03B 21/625*    (2014.01)

(52) U.S. Cl.
    CPC ............. *G03B 21/58* (2013.01); *G03B 21/60* (2013.01); *G03B 21/62* (2013.01); *G03B 21/625* (2013.01)

(58) Field of Classification Search
    USPC .......................................................... 359/443
    See application file for complete search history.

(56) References Cited

U.S. PATENT DOCUMENTS

| | | | | |
|---|---|---|---|---|
| 2017/0092235 | A1* | 3/2017 | Osman | ................. G09G 5/38 |
| 2021/0373352 | A1* | 12/2021 | Fang | ................. G02B 27/62 |

FOREIGN PATENT DOCUMENTS

| | | | | | |
|---|---|---|---|---|---|
| CN | 106919286 | A | | 7/2017 | |
| CN | 106919286 | A | * | 7/2017 | |
| CN | 107101808 | A | * | 8/2017 | ............ G01M 11/02 |
| CN | 107101808 | A | | 8/2017 | |
| CN | 206710716 | U | | 12/2017 | |
| CN | 206710716 | U | * | 12/2017 | |
| CN | 107942517 | A | * | 4/2018 | ......... G02B 27/0101 |
| CN | 107942517 | A | | 4/2018 | |
| CN | 108107577 | A | * | 6/2018 | ........... G02B 27/017 |
| CN | 108107577 | A | | 6/2018 | |
| CN | 109031688 | A | * | 12/2018 | ......... G02B 27/0179 |
| CN | 114354622 | A | * | 4/2022 | |
| CN | 114427955 | A | * | 5/2022 | |
| CN | 114689281 | A | * | 7/2022 | |
| CN | 115014204 | A | * | 9/2022 | |
| CN | 114822284 | B | * | 9/2023 | |
| EP | 3335070 | B1 | * | 11/2020 | ........... G02B 27/017 |
| FR | 3023384 | A1 | * | 1/2016 | ........... B24B 13/0055 |
| WO | WO 2016/001575 | A1 | | 1/2016 | |
| WO | WO-2016001575 | A1 | * | 1/2016 | ......... B24B 13/0055 |

OTHER PUBLICATIONS

Luo et al., Registration of an on-axis See-through Head Mounted Display and Camera System, Schepens Eye Research Institute, Boston MA, Jan. 2005, 25 pg(s) (Year: 2005).*

Ricolfe Viala, C.; et al., The influence of autofocus lenses in the camera calibration process, IEEE Computer Society, 2021, 17 pg(s) (Year: 2021).*

Song et al., Accurate and Fast Eye-box Measurement for Near-eye Display Based on Image Recognition Algorithm, International Conference on Display Technology 2021 (vol. 52, Issue S2), 4 pg(s) (Year: 2021).*

Yang et al., Beam orientation of EAST visible optical diagnostic using a robot-camera system, Fusion Engineering and Design, Jun. 18, 2021, 8 pg(s) (Year: 2021).*

* cited by examiner

POSITIONING METHOD AND POSITIONING APPARATUS FOR DISPLAY SCREEN IN OPTICAL MODULE

CROSS-REFERENCE TO RELATED APPLICATIONS

This application is a National Stage of International Application No. PCT/CN2018/121690, filed on Dec. 18, 2018, which claims priority to Chinese Patent Application No. 201810594018.7, filed on Jun. 11, 2018, both of which are hereby incorporated by reference in their entireties.

TECHNICAL FIELD

The present disclosure relates to the technical field of production detection, and more specifically, the present disclosure relates to a positioning method and a positioning apparatus for a display screen in an optical module.

BACKGROUND

In the current major consumer electronic products such as AR, VR, mobile phone micro-projection, vehicle UHD or the like, the optical module is the core display component. Generally, the display screen is used as the imaging element of the optical module, and the virtual image is presented to human eyes through the optical lens. If the relative position between the display screen and the optical lens cannot meet the tolerance requirements, the virtual image will be unclear, the gap between the edge virtual image distance and the center virtual image distance will be large, the virtual image display will be asymmetrical, which will seriously degrade the image quality and users' experience. Therefore, ensuring the precise alignment between the display screen and the optical lens and improving the yield of products has become a technical problem to be solved urgently in the industry. In order to achieve the precise alignment between the display screen and the optical lens, the current position of the display screen relative to the optical lens must be positioned firstly.

Therefore, it is necessary to provide a positioning method for a display screen in an optical module.

SUMMARY

An object of the present disclosure is to provide a positioning method for a display screen in an optical module.

According to one aspect of the present disclosure, a positioning method for a display screen in an optical module is provided, which comprises the following steps:

arranging light paths of an optical lens and an image receiving device of a product coaxially;

providing the display screen and activating the display screen, wherein the display screen displays an image, and a light path formed by a light ray from the image passes through the optical lens;

receiving the light path passing through the optical lens in real time via the image receiving device to obtain a virtual image;

calculating a slope deviation of the display screen: driving the display screen to move along an axis of the light path, and calculating a tilt angle and a pitch angle of the display screen according to a change of sharpness of each area of the virtual image with coordinates;

calculating a distance deviation from the display screen to the optical lens: driving the display screen to move along the axis of the light path, and calculating a distance that needs to be moved on the axis of the light path according to a coordinate of a peak of sharpness of the virtual image;

calculating a plane position deviation of the display screen: a target surface of the image receiving device has cross hairs, the image has a reference center point and a reference cross hair line, and a plane displacement coordinate and a rotation angle are calculated according to position relationship between dashed lines and the cross hairs.

calibrating a relative position of the display screen according to a calculation result.

Optionally, specific steps of arranging the light paths of the optical lens and the image receiving device of the product coaxially are as follows: using product standard parts to calibrate that a light-emitting surface of the optical lens is coaxial with the light path of the image receiving device, fixing a relative position of the image receiving device and the optical lens, or fixing a relative position of the image receiving device and a carrier used to fix the optical lens.

Optionally, specific steps of calculating the slope deviation of the display screen comprises:

setting a virtual image ROI area, comprising a first area located in a center of the virtual image, a second area, a third area, a fourth area, and a fifth area that are arranged in order and cross-symmetrically around the first area;

moving the display screen along the axis of the light path, and recording axial coordinates when sharpness of the second area, the third area, the fourth area and the fifth area reach the peak, corresponding to Z2, Z3, Z4 and Z5 in sequence;

using formulas k1□|Z2−Z4| and k2*|Z3−Z5| to calculate the tilt angle and the pitch angle of the display screen, wherein k1 and k2 are correction coefficients.

Optionally, specific steps of calculating the distance deviation from the display screen to the optical lens are as follows:

setting a virtual image ROI area, comprising a first area located in a center of the virtual image;

moving the display screen along the axis of the light path, and recording an axial coordinate Z1 when sharpness of the first area reaches the peak;

calculating a difference between an axial coordinate of a current display screen and Z1.

Optionally, specific steps of calculating the plane position deviation of the display screen are as follows:

calibrating positions of the reference center point and the reference cross hair line of the virtual image;

calculating a plane coordinate difference between the reference center point and the center point of the cross hairs on the target surface; and calculating an included angle between the reference cross hair line and a cross hair line of corresponding cross hairs, the included angle being the rotation angle of the display screen.

Optionally, the image comprises a first image and a second image, and the display screen displays the first image when calculating the slope deviation of the display screen and the distance deviation from the display screen to the optical lens; the second image is a cross hair, and the second image is displayed when calculating the plane position deviation of the display screen.

Optionally, a pixel value of the image receiving device is 10 or more times higher than the pixel value of the display screen.

Optionally, the optical lens is a single Fresnel lens, a multiple optical system or a cemented optical prism.

According to another aspect of the present disclosure, the present application provides a positioning apparatus for a display screen in an optical module, comprising: a first six-axis adjustment mechanism, a carrier, an image receiving device and a second six-axis adjustment mechanism, wherein the first six-axis adjustment mechanism is used to connect with the display screen and is capable of driving the display screen to move, the carrier is used to fix the optical lens, the lens of the image receiving device is directly opposite to the carrier, and the second six-axis adjustment mechanism is connected to the image receiving device and is capable of driving the image receiving device to move.

Optionally, the positioning apparatus further comprises a dot screen panel used to electrically connect with the display screen to control the display screen to display images.

One technical effect of the present disclosure is that it can detect the positional deviation of the six degrees of freedom between the display screen and the optical lens.

Other features and advantages of the disclosure will become clear from the following detailed description of exemplary embodiments of the disclosure with reference to the drawings.

BRIEF DESCRIPTION OF THE DRAWINGS

The drawings that form a part of the description describe embodiments of the disclosure, and together with the description serve to explain the principles of the disclosure.

Figure 1:
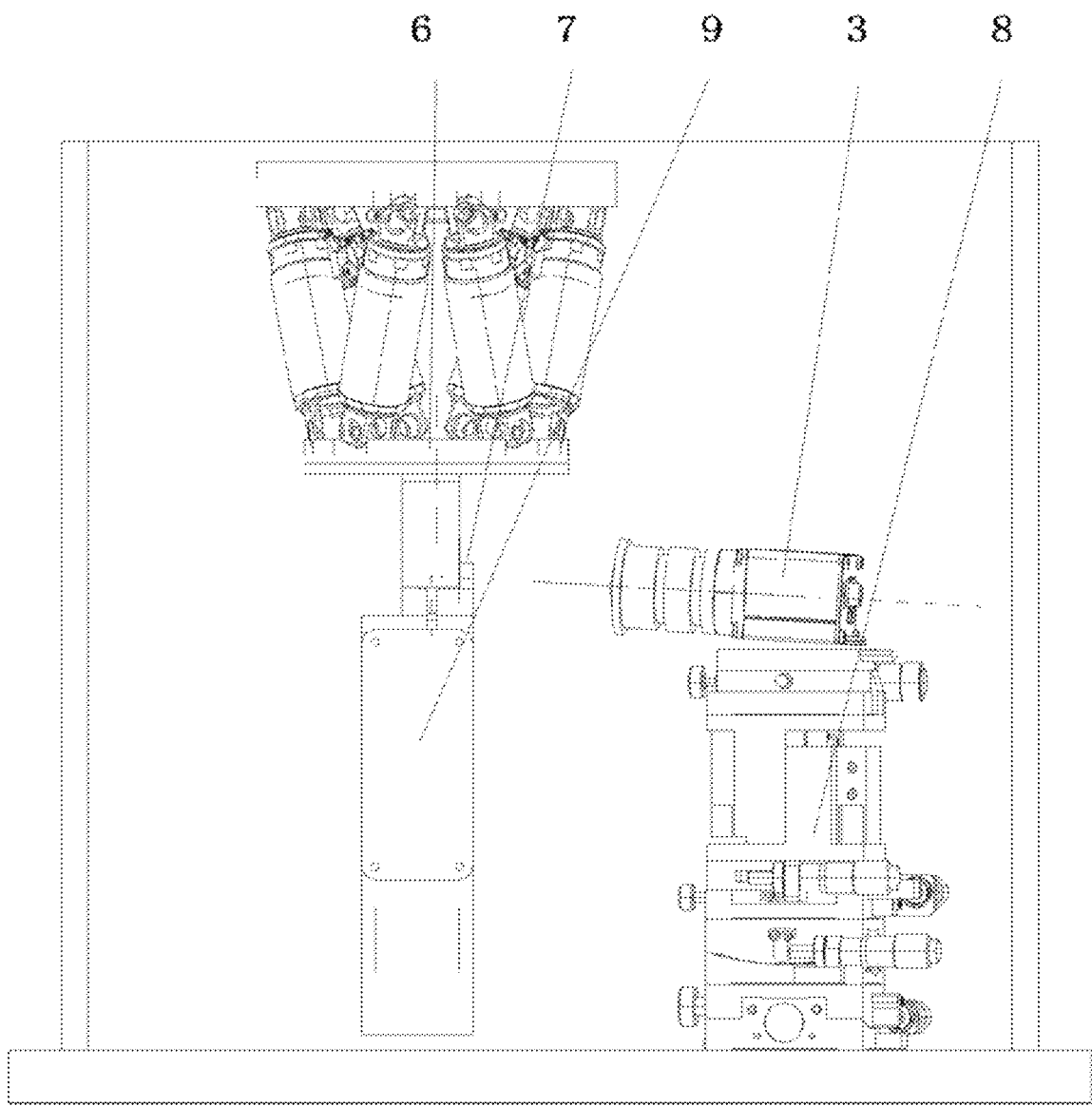
FIG. 1 is a schematic structural diagram of some embodiments.

In the drawings: display screen 1, optical lens 2, image receiving device 3, first image 4, first area 41, second area 42, third area 43, fourth area 44, fifth area 45, second image 5, first six-axis adjustment mechanism 6, carrier 7, second six-axis adjustment mechanism 8, point screen panel 9.

DETAILED DESCRIPTION

Various exemplary embodiments of the disclosure will now be described in detail with reference to the drawings. It should be noted that: unless specifically stated otherwise, the relative arrangement of components and steps, numerical expressions, and numerical values set forth in these embodiments do not limit the scope of the disclosure.

The following description of at least one exemplary embodiment is actually merely illustrative, and in no way serves as any limitation on the disclosure and its application or use.

Techniques and devices known to those of ordinary skill in the related art may not be discussed in detail, but where appropriate, the techniques and devices should be considered as part of the description.

In all examples shown and discussed herein, any specific values should be interpreted as exemplary only and not as limitations. Therefore, other examples of the exemplary embodiment may have different values.

It should be noted that similar reference numerals and letters indicate similar items in the following drawings, so once an item is defined in one drawing, it does not need to be further discussed in the subsequent drawings.

In some embodiments, a positioning method for a display screen in an optical module provided in the present disclosure comprises the following steps:

Arranging light paths of an optical lens 2 and an image receiving device 3 of a product coaxially and determining the relative position between the optical lens 2 and the image receiving device 3. The optical lens 2 may be a single Fresnel lens, a multiple optical system or a cemented optical prism, etc. The image receiving device 3 may be an industrial camera, and then may be further used with a telephoto lens, opened to the maximum aperture to improve detection accuracy, or with other image receiving devices capable of receiving light, which is not limited in this application.

The display screen 1 is provided and the display screen 1 is activated, so that the image is displayed on the display screen 1. The light path formed by the light from the display screen 1 passes through the optical lens 2. The approximate position between the display screen and the optical lens 2 has been determined when arranging the display screen 1, thus the light emitted by the display screen 1 must pass through the optical lens 2 and then be refracted or/and reflected by the optical lens 2 and exit from the light-omitting surface of the optical lens 2.

The image receiving device 3 is located on the light path of the light emitted from the light-emitting surface of the optical lens 2, and receives the light path through the optical lens 2 in real time to obtain a virtual image. In order to further improve the detection accuracy and efficiency, additional information processing device, such as computers, can be added to replace the human to obtain the required information from the obtained virtual image.

A slope deviation of the display screen 1 is calculated: driving the display screen 1 to move along an axis of the light path, and extracting the required coordinate value for calculation according to a preset algorithm and calculating the tilt angle and the pitch angle of the display screen 1, according to a change of sharpness of each area of the virtual image with coordinates.

A distance deviation from the display screen 1 to the optical lens 2 is calculated: driving the display screen 1 to move along the axis of the light path, and finding the coordinate of the peak of sharpness of the virtual image, and it can be calculated to move to this coordinate, the distance that the display screen 1 needs to move on the axis of the light path.

A plane position deviation of the display screen 1 is calculated: a target surface of the image receiving device 3 has the cross hairs, the image has a reference center point and a reference cross hair line, and a plane displacement coordinate and a rotation angle are calculated according to position relationship between dashed lines and the cross hairs, such that the reference center point and the reference cross hair line coincide with the cross hairs on the target surface.

The relative position of the display screen 1 is calibrated according to the calculation result, which can be performed immediately after the corresponding data is calculated at each step, or can be finished in one time after calculations of all the steps are finished. After the calibration is completed, the above calculation steps can also be repeated for the secondary calibration to ensure the accuracy of the calibration. The calculation sequence may be of completing at one time for the above calculation sequence, or does not need to follow the above calculation sequence. High-precision positioning may be performed even after a plurality of repetitive calculations and calibrations. Therefore, this application does not limit its sequence. The initial position of the display screen 1 is defined as the origin, and then the three-dimensional coordinates of the calibrated display screen position is the overall deviation of the display screen 1 before adjustment, such that the display screen 1 is accurately positioned.

The position deviation of the six degrees of freedom between the display screen 1 and the optical lens 2 can be detected by using the positioning method of the present disclosure. Further, according to the above detection results, combined with an automatic adjustment mechanism, a closed-loop positioning system, such as a six-axis adjustment platform, can be formed to realize the automatic and precise adjustment of the display screen 1, meet the assembly requirements, and improve the yield rate. Further, this method may also be used to verify the allowed deviation range without affecting the use. For example, after the display screen 1 and the optical lens 2 in the optical module that are assembled and meet the requirements of use are fixed by an external mechanism, the housing and bracket of the optical module may be removed for the detection and calculation.

In some embodiments, specific steps of coaxially arranging the light paths of the optical lens 2 and the image receiving device 3 of the product are: using the product standard parts to calibrate that the light-emitting surface of the optical lens 2 is coaxial with the light path of the image receiving device 3, fixing the product standard parts, and then calibrating by adjusting the relative position of the image receiving device 3, wherein the calibration process may refer to the above calculation process; alternatively, after fixing the product standard parts, arranging a mirror in front of the lens of the image receiving device 3, and when all the light may be reflected in the original path, the slope deviation is calibrated, and then only the distance deviation and plane position deviation are calculated. Product standard parts are samples whose optical performance fully meets the requirements.

After the relative position is calibrated, the relative position of the image receiving device 3 and the optical lens 2 is fixed to locate the relative coordinates of the display screen each time, and then this coordinate information and the coordinate information of the optical lens are input on the automated production line to complete the corresponding positioning and assembly of the display screen; or the relative position of the image receiving device 3 and the carrier 7 used for fixing the optical lens 2 is fixed, and after each positioning is completed, the relative position between them is maintained, and image receiving device and the carrier are connected together to ensure the accuracy of the product, wherein the connection method may be directly connected by bonding or indirectly fixed on the bracket by bonding, which can effectively guarantee the precise positioning and yield rate of the product.

In some embodiments, specific steps of calculating the slope deviation of the display screen 1 comprises:
setting a virtual image ROI area, comprising a first area 41 located in a center of the virtual image, a second area 42, a third area 43, a fourth area 44, and a fifth area 45 that are arranged in sequence and cross-symmetrically around the first area 41;
moving the display screen 1 along the axis of the light path, wherein the axis of the light path is defined as Z axis and the initial position may be defined as origin, and recording Z-axis coordinates when the sharpness of the second area 42, the third area 43, the fourth area 44 and the fifth area 45 reach the peak, corresponding to Z2, Z3, Z4 and Z5 in sequence;
using formulas $*|Z2-Z4|$ and $k2*|Z3-Z5|$ to calculate the tilt angle and the pitch angle of the display screen 1, wherein k1 and k2 are correction coefficients. Different correction coefficients for test patterns at different fields of view may be calibrated. The tilt angle and the pitch angle are the slope deviation of the display screen 1, that is, the deviation between the axis of the light path of the display screen 1 and the axis of the light path of the standard part.

In some embodiments, specific steps of calculating the distance deviation from the display screen 1 to the optical lens 2 are as follows:
setting a virtual image ROI area, comprising a first area 41 located in a center of the virtual image;
moving the display screen 1 along the axis of the light path, and recording an axial coordinate Z1 when the sharpness of the first area reaches the peak;
calculating a difference between an axial coordinate of a current display screen 1 and Z1, that is the distance deviation from the display screen 1 to the optical lens 2.

In some embodiments, specific steps of calculating the plane position deviation of the display screen 1 are as follows:
calibrating positions of the reference center point and the reference cross hair line of the virtual image;
calculating a plane coordinate difference between the reference center point and the center point of the cross hairs on the target surface, defining as a XY plane among the Z-axis, X-axis and Y-axis which are perpendicular to each other;
calculating an included angle between the reference cross hair line and a cross hair line of corresponding cross hairs, the included angle being a rotation angle of the display screen 1, that is a rotation angle around the Z-axis. Those skilled in the art can understand that the aforementioned tilt angle and pitch angle are the angles required to rotate the X-axis and the Y-axis.

Figure 3:
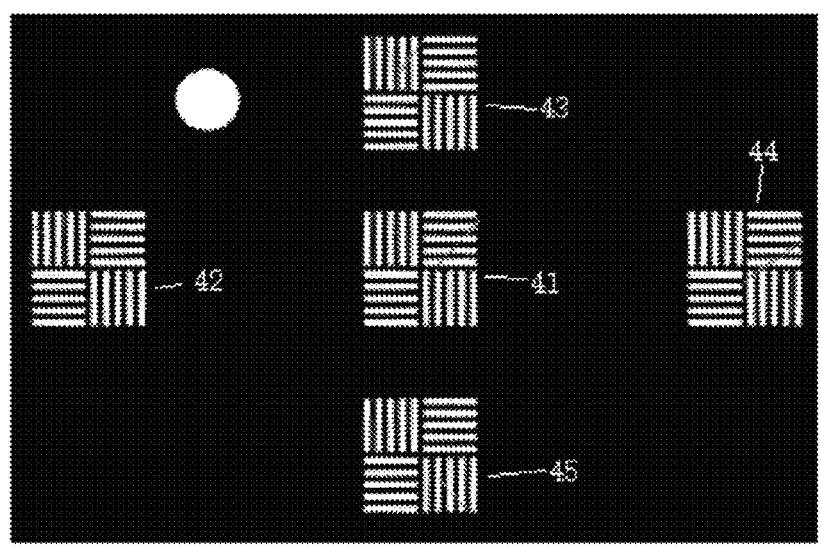
FIG. 3 is a schematic diagram of a first image in some embodiments.
Figure 4:
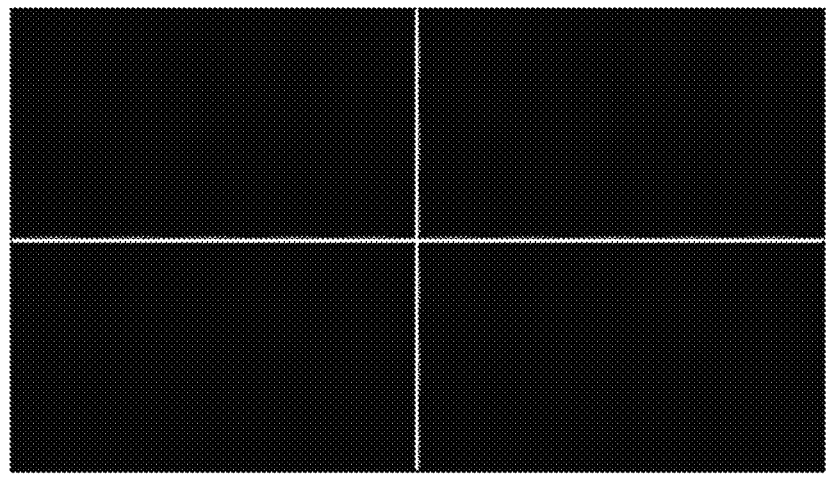
FIG. 4 is a schematic diagram of a second image in some embodiments.
Figure 5:
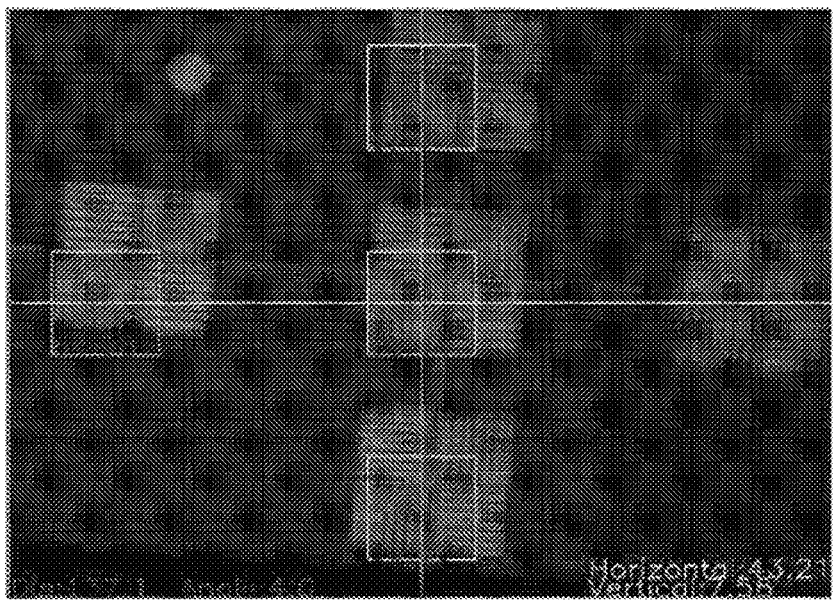
FIG. 5 is a schematic diagram of a virtual image before adjustment in some embodiments.
Figure 6:
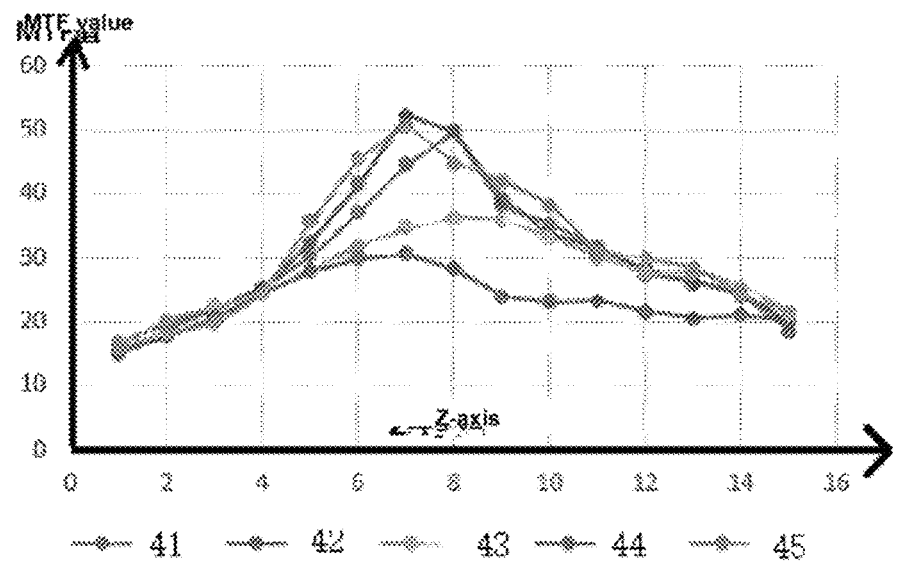
FIG. 6 is a curve of the sharpness of each position along the axis of the light path before adjustment in FIG. 5.
Figure 7:
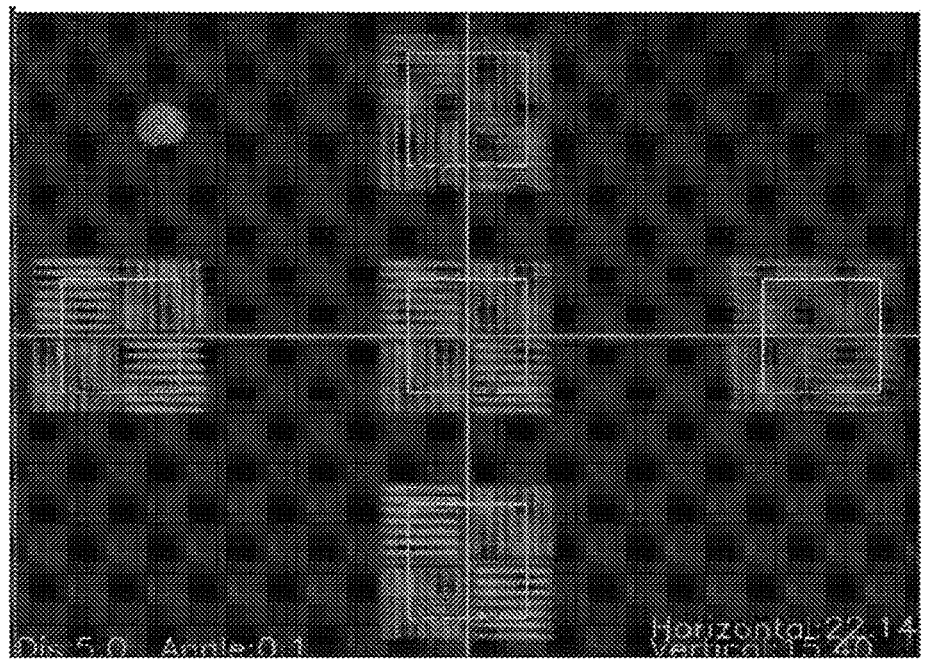
FIG. 7 is a schematic diagram of an adjusted virtual image in some embodiments.
Figure 8:
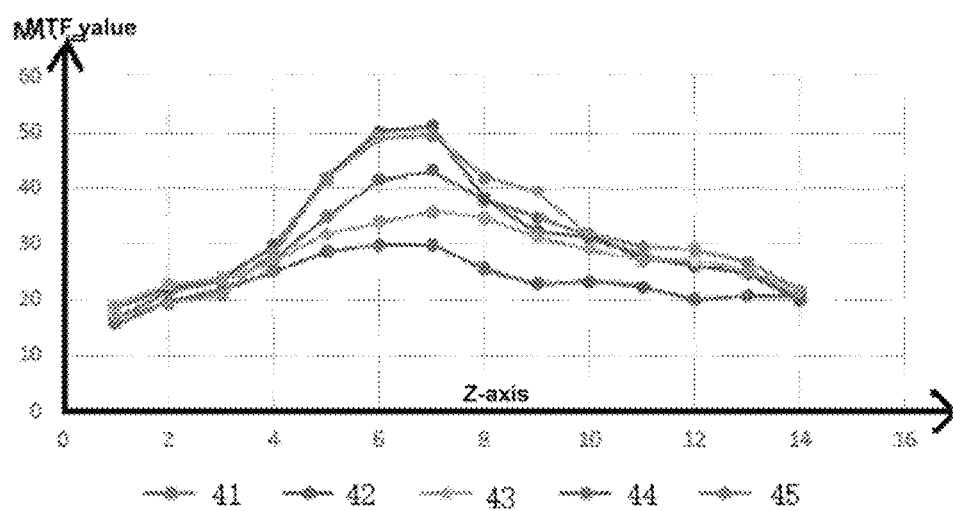
FIG. 8 is a curve of the sharpness of each position along the axis of the light path after adjustment in FIG. 7.

In some embodiments, the image comprises a first image 4 and a second image 5, such as the images shown in FIGS. 3 and 4. The display screen 1 displays the first image 4 when calculating the slope deviation of the display screen 1 and the distance deviation from the display screen 1 to the optical lens 2; the second image 5 is a cross hair, and the second image is displayed when calculating the plane position deviation of the display screen 1.

In some embodiments, the pixel value of the image receiving device 3 is 10 or more times higher than the pixel value of the display screen 1, which can improve detection accuracy, ensure the accurate positioning, and reduce the deviation.

As shown in FIG. 5 to FIG. 8, it can be seen that before the adjustment of the display screen, the Z values that reach the maximum sharpness at 5 different positions are not consistent. After the adjustment of the display screen, the Z-values that reach the maximum sharpness at 5 different positions are substantially the same. There are both in-plane rotation and in-plane offset between the virtual image before adjustment and the camera target surface. The position of the virtual image after the adjustment substantially coincides with the cross hair of the camera target surface, such that the present disclosure may be effectively applied in the process of industrial production detection.

Figure 2:
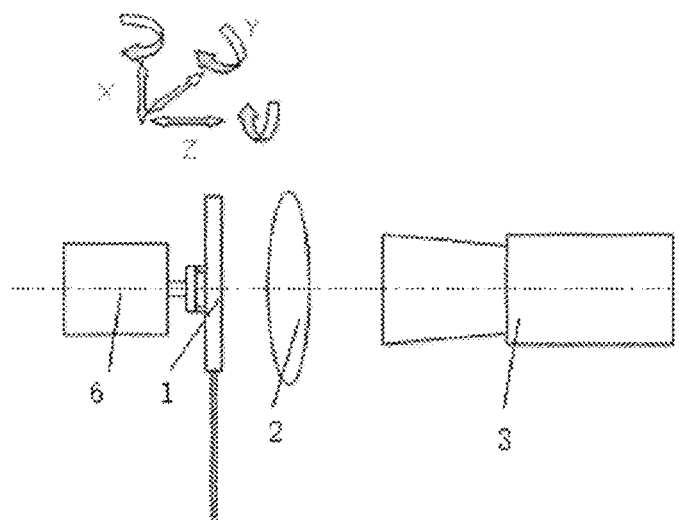
FIG. 2 is a schematic diagram of the principle of the present disclosure.

According to another aspect of the present disclosure, the present disclosure also provides a positioning device for a display screen in an optical module. In some embodiments, as shown in FIG. 1, a first six-axis adjustment mechanism 6, a carrier 7, an image receiving device 3 and a second six-axis adjustment mechanism 8 are included. The first six-axis adjustment mechanism is used to connect with the display screen 1 and can drive the display screen 1 to move. The carrier 7 is used to fix the optical lens 2. The lens of the image receiving device 3 is directly opposite to the carrier 7, and the second six-axis adjustment mechanism is connected to the image receiving device 3 and can drive the image receiving device 3 to move. The first six-axis adjustment mechanism 6 or/and the second six-axis adjustment mechanism 8 are automatic six-axis adjustment mechanisms, and in some embodiments, they may also be manually operated. The first six-axis adjustment mechanism 6 or/and the second six-axis adjustment mechanism 8 may be high-precision parallel six-axis mechanisms. According to the principle diagram shown in FIG. 2, the positioning device according to the present disclosure may detect the position deviation of the six degrees of freedom between the display screen 1 and the optical lens 2. Further, according to the above detection results, combined with the six-axis automatic adjustment mechanism, a closed-loop positioning system may be formed, which can realize the automatic and precise adjustment of the display screen 1, meeting the assembly requirements, and improving the yield rate. Further, this method may also be used to verify the allowed deviation range without affecting the use. For example, after the display screen 1 and the optical lens 2 in the optical module that are assembled and meet the requirements of use are fixed by an external mechanism, the housing and bracket of the optical module may be removed for the detection and calculation.

In some embodiments, as shown in FIG. 1, the positioning apparatus further comprises a dot screen panel 9; the dot screen panel 9 is used for electrically connecting with the display screen 1 after the display screen 1 is provided, to control the display screen 1 to display the images. The dot screen panel 9 may be a touch screen.

In some embodiments, the positioning apparatus further comprises a processing device that is electrically connected to electronic devices such as the first six-axis adjustment mechanism 6, the image receiving device 3, the second six-axis adjustment mechanism 8, and the dot screen panel 9, etc., so as to control its action and information.

A specific embodiment of the present disclosure:
the industrial camera is connected to the second six-axis adjustment mechanism at the light-emitting surface of the optical lens, thereby simulating the human eye, then the product standard sample is used to calibrate the relative position of the industrial camera. The second six-axis adjustment mechanism is adjusted, such that the light-in axis of the lens coincides with the light-out axis of the optical lens.

The display screen is fixedly connected to the first six-axis adjustment mechanism, and the display screen is connected to the dot screen plate through the FPCB.

The dot screen panel is used to control the display screen to display the first image, the first six-axis adjustment mechanism is used to drive the display screen to translate along the optical axis of the image, and the camera is used to capture the virtual images in real time, analyzing the sharpness values of the first area, second area, third area, fourth area, four area and five area of the ROI area, and finding the corresponding Z-axis coordinates Z1, Z2, Z3, Z4, Z5 when they reach the maximum value.

The relative tilt angle and pitch angle between the current display screen and the optical lens is calculated by k1*|Z1−Z3| and k2*|Z2−Z4; |, and then fed back to the first six-axis adjustment mechanism for the tilt and pitch alignment;

The difference between the Z1 value and the current Z value of the display screen is obtained, and the distance between the display screen and the optical lens is adjusted, such that the sharpness of the first area of the ROI area reaches the maximum.

Then the dot screen panel is used to control the display screen to display the second image, the camera is used to capture the pictures, and then the relative rotation angle between the current display screen and the optical lens around the Z axis is obtained by analyzing the angle between the cross hairs and the target surface of the camera. The two-dimensional translation of the display screen relative to the optical lens in the plane is obtained by analyzing the distance between the center point of the cross hairs and the center of the tartlet surface of the camera and then fed back to the first six-axis adjustment mechanism for the corresponding adjustment.

Through the above steps, the adjustment of degrees of freedom between the display screen and the optical lens is completed.

Although some specific embodiments of the disclosure have been demonstrated in detail by way of examples, it should be understood by a person skilled in the art that the above examples are only intended to be illustrative rather than limiting the scope of the disclosure. It should be understood by a person skilled in the art that the above embodiments can be modified without departing from the scope and spirit of the present disclosure. The scope of the present disclosure is defined by the attached claims.

The invention claimed is:
1. A positioning method for a display screen in an optical module, comprising:
arranging a light path of an optical lens and a light path of an image receiving device of a product coaxially;
providing the display screen and activating the display screen, wherein the display screen displays an image, and a light path is formed by light from the image passes through the optical lens;
receiving the light from the path passing through the optical lens in real time via the image receiving device to obtain a virtual image;
calculating a slope deviation of the display screen by driving the display screen to move along an axis of the light path, and calculating a tilt angle and a pitch angle of the display screen according to a change of sharpness of each area of the virtual image with coordinates;
calculating a distance deviation from the display screen to the optical lens by driving the display screen to move along the axis of the light path, and calculating a movement distance on the axis of the light path according to a coordinate of a peak of sharpness of the virtual image;
calculating a plane position deviation of the display screen, wherein a target surface of the image receiving device has cross hairs, the image has a reference center point and a reference cross hair line, by calculating a plane displacement coordinate and a rotation angle according to position relationship between dashed lines and the cross hairs, and calibrating a relative position of the display screen according to a calculation result.

2. The positioning method according to claim 1, wherein the arranging the light paths of the optical lens and the image receiving device of the product coaxially comprise:

using product standard parts to calibrate that a light-emitting surface of the optical lens is coaxial with the light path of the image receiving device, fixing a relative position of the image receiving device and the optical lens, or fixing a relative position of the image receiving device and a carrier used to fix the optical lens.

3. The positioning method according to claim 1, wherein the calculating the slope deviation of the display screen comprises:

setting a virtual image ROI area, comprising a first area located in a center of the virtual image, a second area, a third area, a fourth area, and a fifth area that are arranged in order and cross-symmetrically around the first area;

moving the display screen along the axis of the light path, and recording axial coordinates when sharpness of the second area, the third area, the fourth area and the fifth area reach the peak, corresponding to Z2, Z3, Z4 and Z5 in sequence;

using formulas k1*|Z2−Z4| and k2*|Z3−Z5| to calculate the tilt angle and the pitch angle of the display screen, wherein k1 and k2 are correction coefficients.

4. The positioning method according to claim 1, wherein the calculating the distance deviation from the display screen to the optical lens comprises:

setting a virtual image ROI area, comprising a first area located in a center of the virtual image;

moving the display screen along the axis of the light path, and recording an axial coordinate Z1 when sharpness of the first area reaches the peak;

calculating a difference between an axial coordinate of a current display screen and Z1.

5. The positioning method according to claim 1, wherein the calculating the plane position deviation of the display screen comprises:

calibrating positions of the reference center point and the reference cross hair line of the virtual image;

calculating a plane coordinate difference between the reference center point and the center point of the cross hairs on the target surface;

calculating an included angle between the reference cross hair line and a cross hair line of corresponding cross hairs, the included angle being the rotation angle of the display screen.

6. The positioning method according to claim 1, wherein, the image comprises a first image and a second image, and the display screen displays the first image when calculating the slope deviation of the display screen and the distance deviation from the display screen to the optical lens; the second image is a cross hair, and the second image is displayed when calculating the plane position deviation of the display screen.

7. The positioning method according to claim 1, wherein, a pixel value of the image receiving device is 10 or more times higher than the pixel value of the display screen.

8. The positioning method according to claim 1, wherein, the optical lens is a single Fresnel lens, a multiple optical system or a cemented optical prism.

9. A positioning apparatus for a display screen in an optical module, configured to implement a positioning method for a display screen in an optical module according to claim 1, comprising: a first six-axis adjustment mechanism, a carrier, an image receiving device and a second six-axis adjustment mechanism, wherein the first six-axis adjustment mechanism is adapted for connecting with the display screen and is capable of driving the display screen to move, the carrier is adapted for fixing the optical lens, the lens of the image receiving device is directly opposite to the carrier, and the second six-axis adjustment mechanism is connected to the image receiving device and is capable of driving the image receiving device to move.

10. The positioning apparatus according to claim 9, further comprising a dot screen panel adapted for electrically connecting with the display screen to control the display screen to display images.

* * * * *